United States Patent
Ogasawara (10) Patent No.: US 8,015,891 B2
(45) Date of Patent: Sep. 13, 2011

(54) ENGINE INCLUDING SPEED-CHANGE ACTUATOR

(75) Inventor: Atsushi Ogasawara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 11/978,563

(22) Filed: Oct. 30, 2007

(65) Prior Publication Data

US 2008/0127766 A1    Jun. 5, 2008

(30) Foreign Application Priority Data

Nov. 30, 2006 (JP) ................... 2006-323482

(51) Int. Cl.
*F16H 59/00* (2006.01)
*F16H 3/08* (2006.01)
*F02B 75/32* (2006.01)

(52) U.S. Cl. ............... 74/335; 74/329; 123/197.1

(58) Field of Classification Search ............ 74/325, 74/329, 331, 335, 337.5; 123/197.1, 197.5
See application file for complete search history.

(56) References Cited

U.S. PATENT DOCUMENTS

| | | | |
|---|---|---|---|
| 4,093,264 A | | 6/1978 | Ishihara et al. |
| 5,025,673 A | * | 6/1991 | Yamada ............ 74/337.5 |
| 5,636,608 A | * | 6/1997 | Shichinohe et al. ...... 123/197.1 |
| 7,357,047 B2 | * | 4/2008 | Hori ................ 74/329 |
| 7,387,042 B2 | * | 6/2008 | Suzuki et al. ............ 74/335 |
| 2002/0043237 A1 | * | 4/2002 | Nomura et al. ........ 123/196 R |
| 2005/0056107 A1 | * | 3/2005 | Tomita et al. ............ 74/325 |
| 2005/0166694 A1 | * | 8/2005 | Fegg ................ 74/335 |
| 2006/0030453 A1 | | 2/2006 | Yokoyama et al. |
| 2006/0068953 A1 | * | 3/2006 | Tsukada et al. ............ 474/8 |
| 2007/0199755 A1 | * | 8/2007 | Takeuchi ............ 180/221 |
| 2008/0078265 A1 | * | 4/2008 | Shiozaki et al. .......... 74/473.12 |

FOREIGN PATENT DOCUMENTS

| | | |
|---|---|---|
| CN | 1211677 A | 3/1999 |
| DE | 10 2004 002 064 A1 | 8/2005 |
| EP | 1 650 122 A2 | 4/2006 |
| JP | 63-125490 A | 5/1988 |
| JP | 11-82050 A | 3/1999 |
| JP | 2001-008315 | 1/2001 |
| JP | 2001-280489 A | 10/2001 |
| JP | 2006-117022 A | 5/2006 |
| WO | WO-01/36261 A1 | 5/2001 |

* cited by examiner

*Primary Examiner* — Roger Pang
(74) *Attorney, Agent, or Firm* — Birch, Stewart, Kolasch & Birch, LLP (57) ABSTRACT

To lower the center of gravity of the entire engine including a speed-change actuator for realization of the lowered center of gravity of a vehicle in which the engine is mounted and to suppress the effect on an arrangement space for components above the engine. In an engine including a transmission which is provided in a power transmission pathway to a drive wheel, a counter shaft which is an output shaft of the transmission, an engine case in which a crankshaft and the transmission are accommodated, and a speed-change actuator which is attached to the engine case, the speed-change actuator is arranged below relative to the counter shaft.

10 Claims, 8 Drawing Sheets

ENGINE INCLUDING SPEED-CHANGE ACTUATOR

CROSS-REFERENCE TO RELATED APPLICATIONS

This nonprovisional application claims priority under 35 U.S.C. §119(a) on Patent Application No. 2006-323482, filed in Japan on Nov. 30, 2006, the entirety of which is incorporated herein by reference.

BACKGROUND OF THE INVENTION

1. Field of the Invention

The present invention relates to an engine including a speed-change actuator suitable for a saddle-ride type vehicle, such as a motorcycle.

2. Background of the Invention

In the past, there has been disclosed an engine in which a speed-change actuator for controlling a speed-change operation of a transmission is arranged on an upper surface of an engine case that accommodates a crankshaft and the transmission (For example, refer to Japanese Patent Application Laid-Open Publication No. S63-125490).

The speed-change actuator has a relatively heavy weight because it includes an electric motor. Thus, in the case where the speed-change actuator is arranged on an upper surface of the engine case as in the past configuration, there is a problem in that the center of gravity of the whole engine is likely to rise and it is difficult to lower the center of gravity of the vehicle when the engine is mounted in the vehicle. In addition, in the case where vehicle functional components of the vehicle are arranged above the engine, there is a problem in that the speed-change actuator arranged on an upper surface of the engine case is likely to have an impact on an arrangement space for the functional components.

SUMMARY OF THE INVENTION

In the engine including a speed-change actuator, an object of the present invention is to lower the center of gravity of the entire engine for realization of a lowered center of gravity of a vehicle in which the engine is mounted, and to suppress the effect on an arrangement space for components above the engine.

As means for addressing the above-described problem, a first aspect of the present invention is directed to an engine (for example, an engine 13 or 151 in the embodiments) including a speed-change actuator, including: a transmission (for example, a twin-clutch transmission 23 in the embodiments) which is provided in a power transmission pathway through which a rotational drive power of a crankshaft (for example, a crankshaft 21 in the embodiments) is transmitted to a drive wheel (for example, a rear wheel 11 in the embodiments); an output shaft (for example, a counter shaft 29 in the embodiments) which configures a part of the transmission and through which the rotational drive power of the crankshaft that is transmitted to the transmission is output to the drive wheel-side; an engine case (for example, an engine case 14A in the embodiments) in which the crankshaft and the transmission are accommodated; and a speed-change actuator (for example, a speed-change actuator 124 in the embodiments) which is attached to the engine case to control a speed-change operation of the transmission, wherein the speed-change actuator is arranged below relative to the output shaft.

A second aspect of the present invention is directed to the engine including a speed-change actuator, further including a transmission mechanism (for example, a transmission mechanism 122A, 154A, or 154A' in the embodiments) which is provided between the speed-change actuator and a change mechanism (for example, a change mechanism 24 in the embodiments) that allows the transmission to perform a speed-change operation and which transmits a drive power of the speed-change actuator to the change mechanism, wherein the transmission mechanism is arranged below relative to the output shaft.

A third aspect of the present invention is directed to the engine including a speed-change actuator, wherein the speed-change actuator is arranged below relative to the transmission mechanism.

A fourth aspect of the present invention is directed to the engine including a speed-change actuator, wherein the speed-change actuator is an electric motor, and an axis line (for example, a rotational drive axis line C4 in the embodiments) of the electric motor is obliquely arranged relative to the vehicle traveling direction.

A fifth aspect of the present invention is directed to the engine including a speed-change actuator, wherein the engine case has a generator cover (for example, a generator cover 104 in the embodiments) that laterally protrudes, and the speed-change actuator is arranged on the generator cover-side in the engine case and on the inner side relative to an outer end of the generator cover.

A sixth aspect of the present invention is directed to the engine including a speed-change actuator, wherein the speed-change actuator is arranged below relative to the generator cover.

A seventh aspect of the present invention is directed to the engine including a speed-change actuator, wherein the engine case has an oil pan (for example, an oil pan 106 in the embodiments) that protrudes downward, and the speed-change actuator is arranged around the oil pan.

According to the first and second aspects of the present invention, the center of gravity of the whole engine is lowered, and thus the lowered center of gravity of the vehicle can be realized. In addition, although a plurality of vehicle functional components such as components for air intake and electric components are usually arranged above the engine, it is possible to suppress the effect on arrangement spaces for the respective functional components by arranging the speed-change actuator and the transmission mechanism at a lower position of the engine.

According to the third aspect of the present invention, the speed-change actuator having a relatively heavy weight can be arranged below relative to the transmission mechanism, thus realizing the further lowered center of gravity of the vehicle.

According to the fourth aspect of the present invention, traveling wind is likely to hit the speed-change actuator (electric motor), and thus the speed-change actuator can be easily cooled.

According to the fifth aspect of the present invention, a space formed around the generator cover can be effectively used as an arrangement space for the speed-change actuator. In addition, it is possible to suppress an increase in dimension of the outer shape of the engine by arranging the speed-change actuator on the inner side relative to an outer end of the generator cover.

According to the sixth aspect of the present invention, traveling wind is likely to hit the speed-change actuator, thus realizing the further lowered center of gravity of the vehicle.

According to the seventh aspect of the present invention, a space formed around the oil pan can be effectively used as an arrangement space for the speed-change actuator, and in addition, the further lowered center of gravity of the vehicle can be realized. Further, since the degree of freedom of the shape of the oil pan is relatively high, a region in the oil pan where the speed-change actuator is arranged is concaved, so that it is possible to suppress an increase in dimension of the outer shape of the engine while preventing the speed-change actuator from protruding in a wide range toward the outside of the oil pan. Furthermore, since the number of vehicle functional components is relatively small around the oil pan, it is possible to relatively freely arrange the speed-change actuator while suppressing the effect on an arrangement for the functional components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

Hereinafter, embodiments of the present invention will be described with reference to the drawings. It should be noted that the directions of front, rear, left, right, and the like in the following description are the same as those of a vehicle unless otherwise described. Further, arrows FR, LH, and UP in the drawings indicate the front, left, and upper of the vehicle, respectively.

First Embodiment

Figure 1:
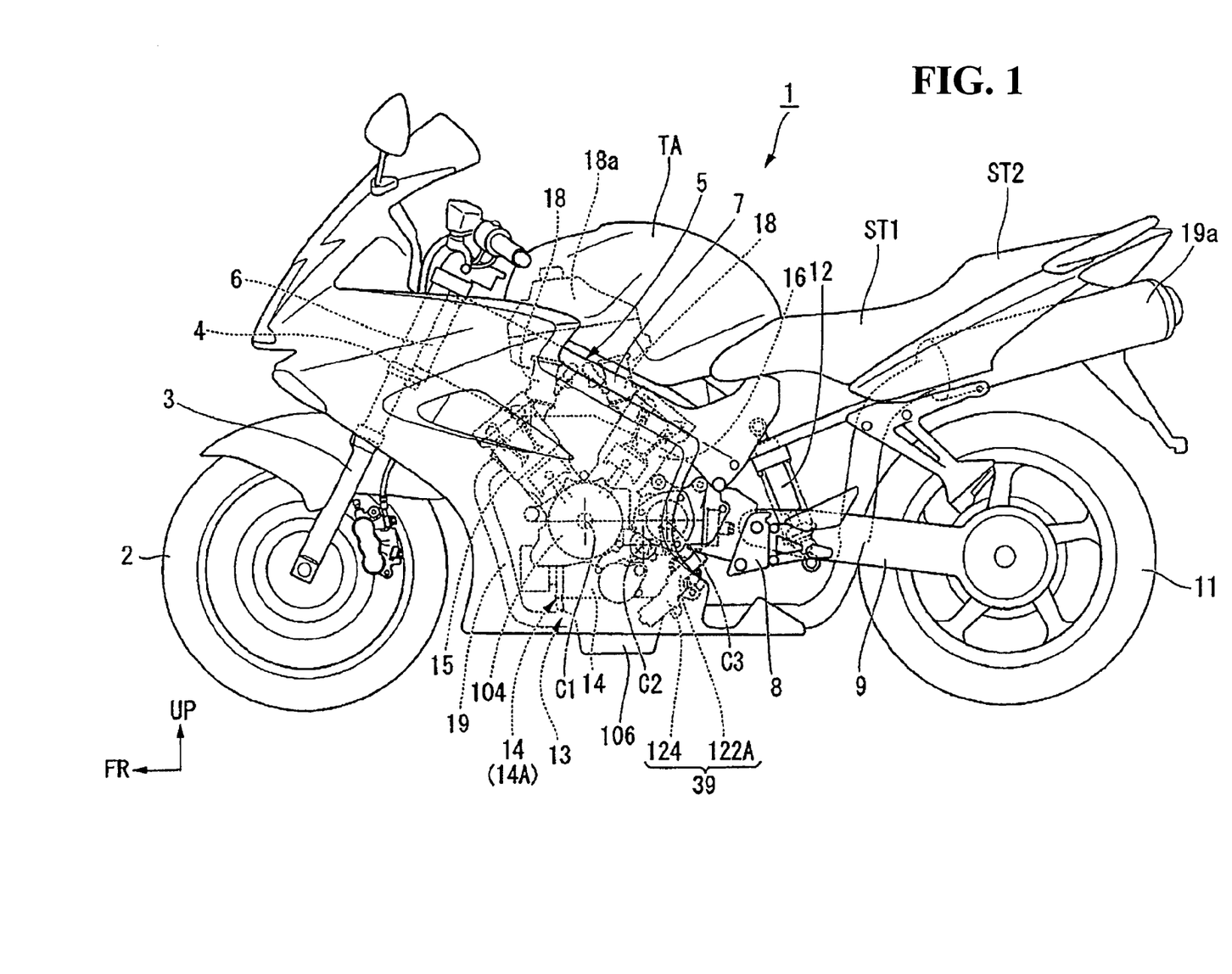
FIG. 1 is a left side view of a motorcycle in an embodiment of the present invention.

As shown in FIG. 1, an upper portion of a front fork 3 to which a front wheel 2 of a motorcycle (saddle-ride type vehicle) 1 is journaled is steerably supported by a head pipe 6 located at a front end of a body frame 5, through a steering stem 4. A main frame 7 extends rearward from the head pipe 6, and reaches the vicinity of pivot plates 8. A front end of a swing arm 9 is supported by the pivot plates 8 in a vertically swingable manner. A rear wheel 11 is journaled to a rear end of the swing arm 9.

A cushion unit 12 is interposed between the swing arm 9 and the body frame 5. A fuel tank TA is arranged above the main frame 7. A front seat ST1 for a rider and a pillion ST2 for a pillion passenger are arranged behind the fuel tank TA. An engine (internal combustion engine) 13 as a power plant of the motorcycle 1 is arranged below the main frame 7.

Figure 2:
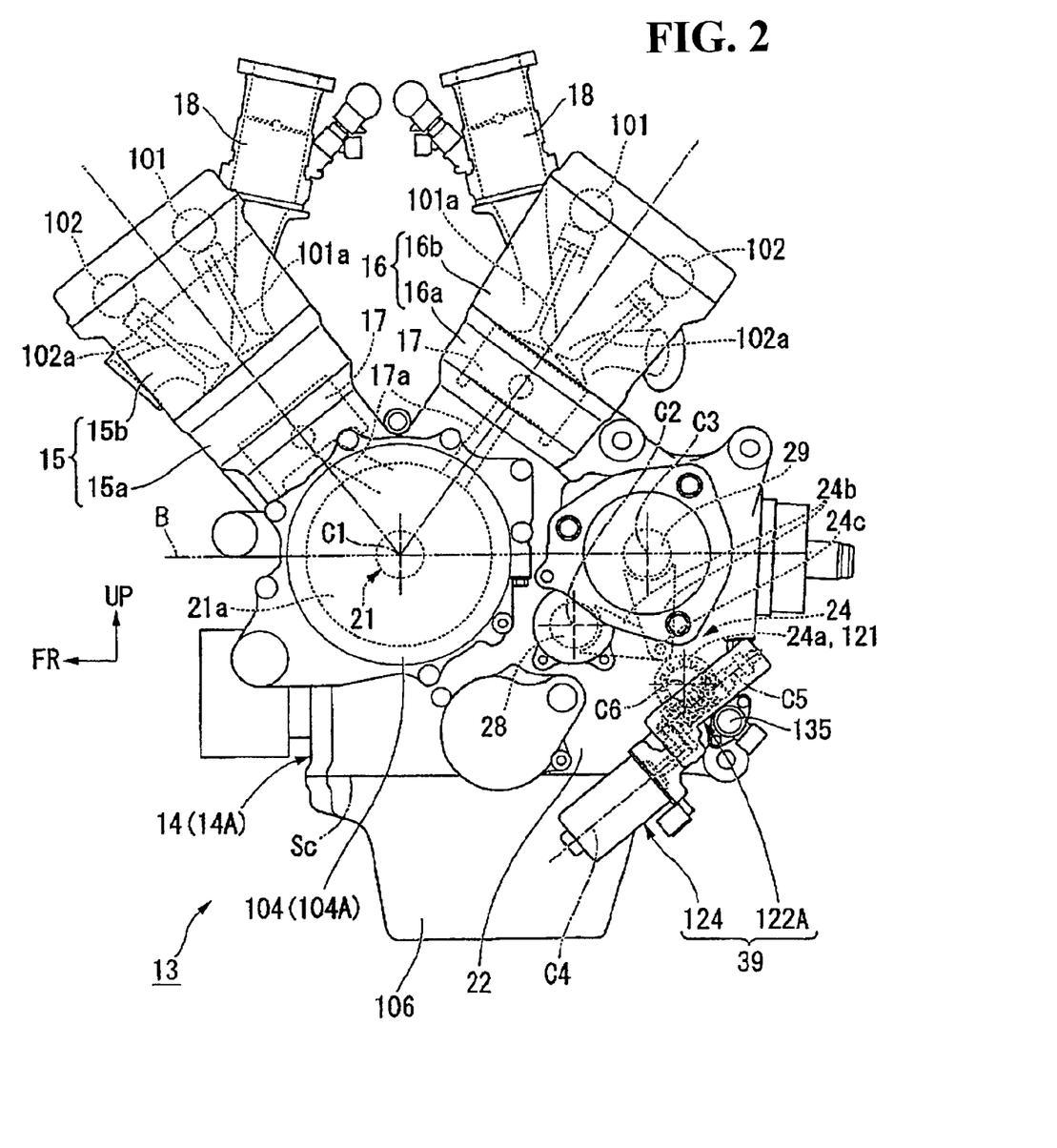
FIG. 2 is a left side view of an engine of the motorcycle.

With reference to FIG. 2, the engine 13 is a V-type four-cylinder engine in which a crankshaft axis line (a rotational center axis line of a crankshaft 21) C1 is directed in the vehicle-width direction (the left-right direction). A forward-inclined cylinder part 15 and a rearward-inclined cylinder part 16 are provided on a crankcase 14 in an erect manner. The cylinder parts 15 and 16 include cylinders 15a and 16a which are provided integrally with the crankcase 14, and cylinder heads 15b and 16b which are attached on the cylinders 15a and 16a, respectively.

Pistons 17 are fitted into the cylinders 15a and 16a, and reciprocating motions of the pistons 17 are converted into rotational motions of the crankshaft 21 through connecting rods 17a. The rotational drive power of the crankshaft 21 is input from a primary drive gear 58a at a right end of the crankshaft 21 to a twin-clutch transmission 23, to be described later, and then is transmitted to the rear wheel 11 from the rear left side of the crankcase 14 through, for example, a shaft-drive-type power transmission mechanism.

In each of the cylinder heads 15b and 16b, there is provided a valve mechanism composed mainly of intake and exhaust cam shafts 101 and 102 in parallel with the crankshaft 21, and intake and exhaust valves 101a and 102a corresponding to the respective cam shafts. A cam chain chamber 103a in which a cam chain for driving the valve mechanism is accommodated is provided on the right side relative to each of the cylinder parts 15 and 16 (see FIG. 3).

Throttle bodies 18 corresponding to the respective cylinders are arranged between banks of the cylinder parts 15 and 16. The downstream sides of the throttle bodies 18 are connected to a rear portion of the forward-inclined cylinder head 15b and a front portion of the rearward-inclined cylinder head 16b. An air cleaner case 18a is arranged above the engine 13, and the upstream sides of the throttle bodies 18 are connected to the air cleaner case 18a.

Proximal ends of exhaust pipes 19 corresponding to the respective cylinders are connected to a front portion of the forward-inclined cylinder head 15b and a rear portion of the rearward-inclined cylinder head 16b. The respective exhaust pipes 19 are arranged below a rear portion of the crankcase 14 while being appropriately bent, and are assembled to one pipe, which then extends, for example, upward to be connected to a silencer 19a located below the pillion ST2.

The engine 13 has a structure in which the transmission part is provided integrally therewith, and a transmission case 22 for accommodating therein the twin-clutch transmission 23, to be described later, and a change mechanism 24 for shifting a speed-change gear of the twin-clutch transmission is configured at a rear portion of the crankcase 14. Specifically, the cylinders 15a and 15b, and the transmission case 22 are integrally formed in the crankcase 14.

Figure 3:
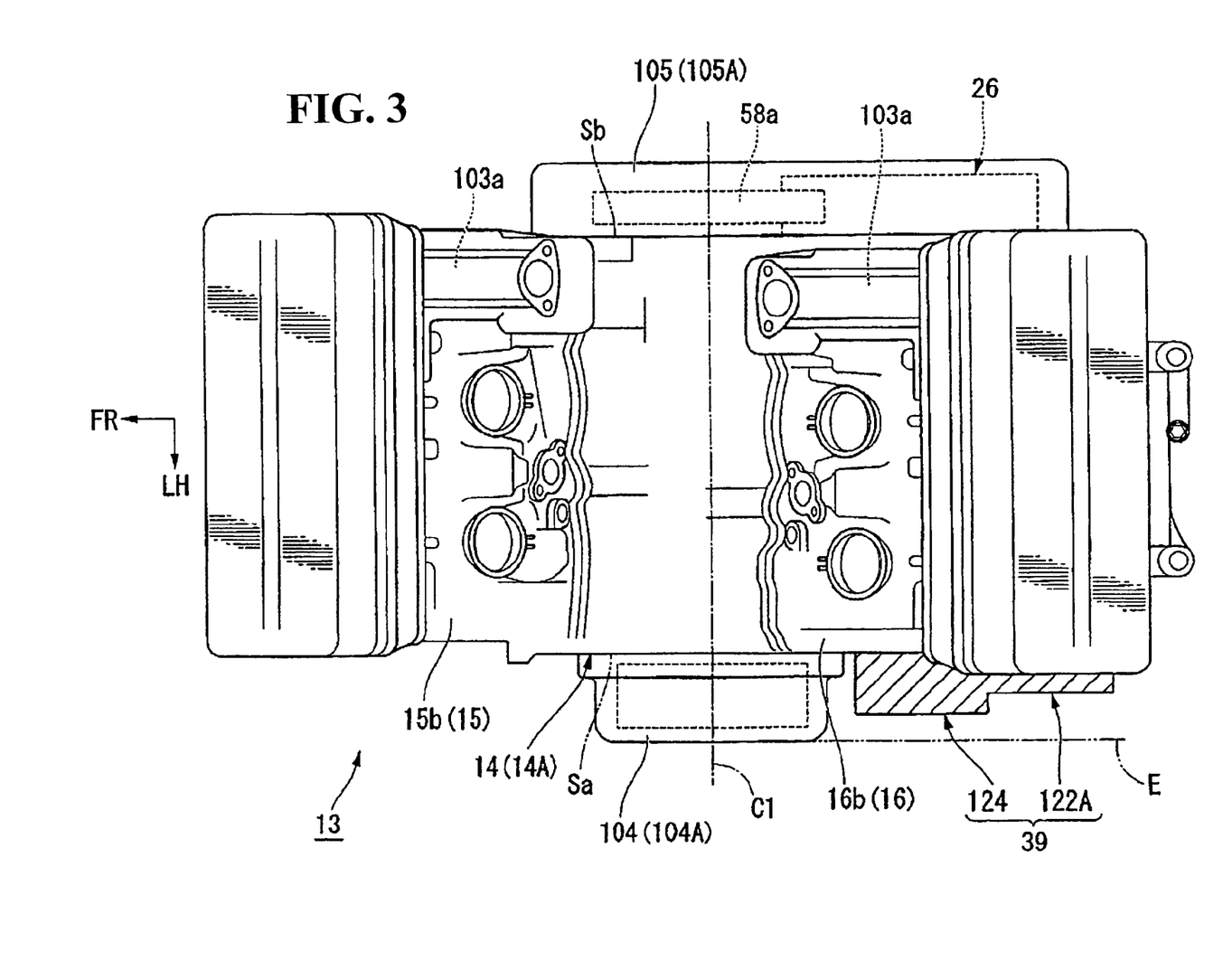
FIG. 3 is a top view of the engine.

With reference to FIG. 3, a generator cover 104 protruding leftward from a left face Sa of the crankcase 14 is attached to the left face Sa, a clutch cover 105 protruding rightward from a right face Sb of the crankcase 14 is attached to the right face Sb. An oil pan 106 protruding downward from a lower face Sc of the crankcase 14 is attached to the lower face Sc. Hereinafter, an assembly of the crankcase 14, the generator cover 104, the clutch cover 105, the oil pan 106, and the like is referred to as an engine case 14A.

A twin clutch 26 of the twin-clutch transmission 23 and the primary drive gear 58a in front of the twin clutch 26 protrude rightward relative to the right face Sb of the crankcase 14. The clutch cover 105 is provided so as to cover the twin clutch 26 and the primary drive gear 58a. The clutch cover 105, together with a right portion of the crankcase 14, configures a clutch case 105A for accommodating therein the twin clutch 26 and the primary drive gear 58a.

A generator 21a is coaxially provided at a left end of the crankshaft 21. The generator 21a protrudes leftward relative to the left face Sa of the crankcase 14. The generator cover 104 is provided so as to cover the generator 21a. The generator cover 104, together with a right portion of the crankcase 14, configures a generator case 104A for accommodating therein the generator 21a.

In the engine 13, three main shafts, namely, the crankshaft 21, a main shaft 28 and a counter shaft 29, in parallel with the crankshaft 21, in the twin-clutch transmission 23 are arranged while forming a triangle. Specifically, the axis lines C1 and C3 of the crankshaft 21 and the counter shaft 29 are arranged on an up/down dividing plane B, which is substantially horizontal, in the crankcase 14, and the axis line C2 of the main shaft is arranged below the dividing plane B and in front of the counter shaft 29. The change mechanism 24 is arranged obliquely below and behind the main shaft 28 and the counter shaft 29.

Figure 4:
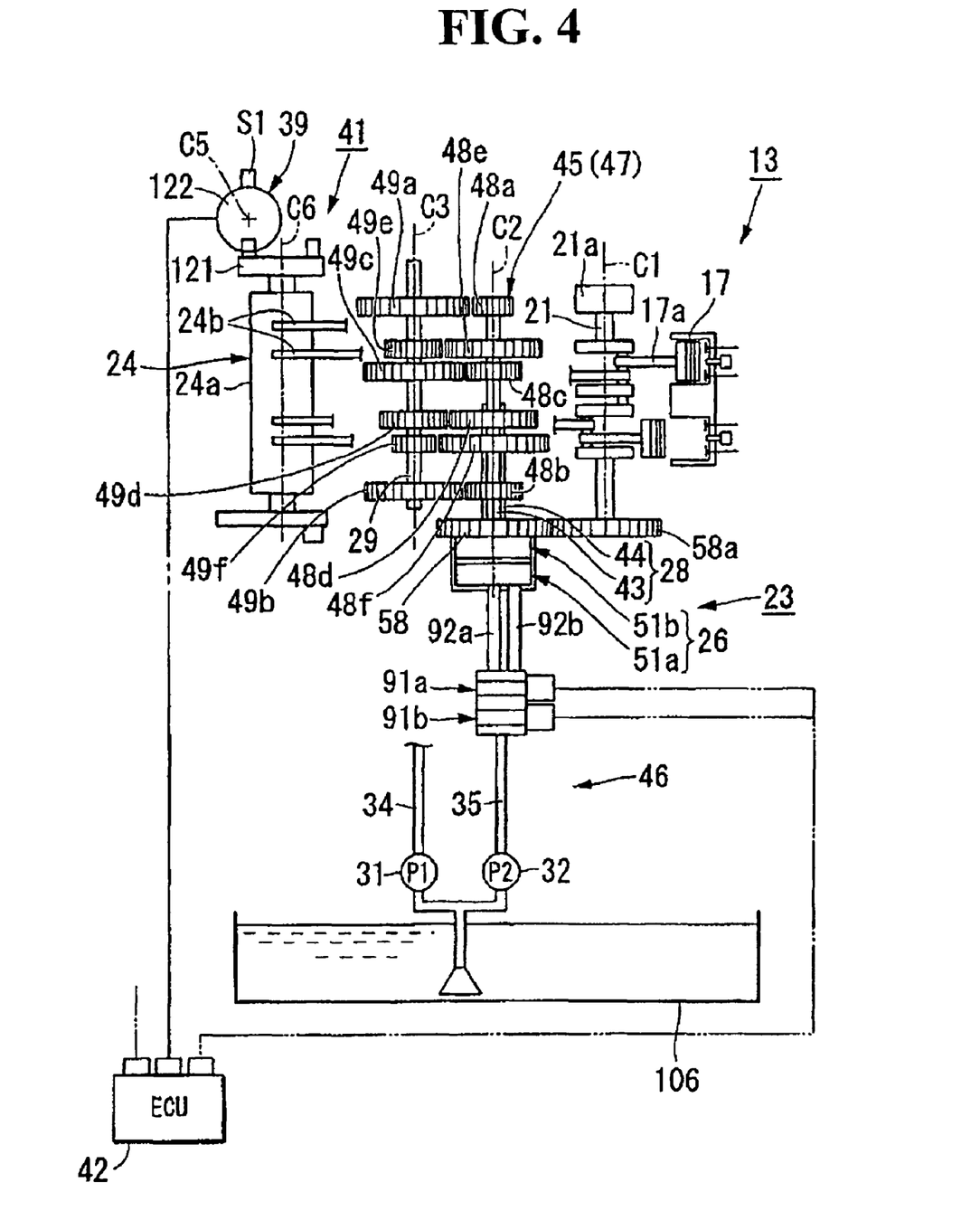
FIG. 4 is a schematic configuration view of a twin-clutch transmission of the engine.

As shown in FIG. 4, the motorcycle 1 includes an automatic transmission system composed mainly of the twin-clutch transmission 23 continued to the engine 13, a gear shift apparatus 41 configured by providing a drive mechanism 39 in the change mechanism 24, and an electronic control unit (ECU) 42 for operating and controlling the twin-clutch transmission 23 and the gear shift apparatus 41.

The twin-clutch transmission 23 has the main shaft 28 of a double structure composed of inner and outer shafts 43 and 44, the counter shaft 29 which is arranged in parallel with the main shaft 28, a speed-change gear group 45 which is arranged across the main shaft 28 and the counter shaft 29, the twin clutch 26 which is coaxially arranged at a right end of the main shaft 28, and a hydraulic pressure supplying apparatus 46 which supplies a hydraulic pressure for operating the twin clutch 26 to the twin clutch 26. Hereinafter, an assembly composed of the main shaft 28, the counter shaft 29, and the speed-change gear group 45 is referred to as a transmission 47.

The main shaft 28 is configured in such a manner that a right side portion of the inner shaft 43 is inserted into the relatively-short outer shaft 44 in a relatively-rotatable manner. At the outer circumference of the inner and outer shafts 43 and 44, drive gears 48a to 48f of six speeds in the speed-change gear group 45 are sorted and arranged. On the other hand, at the outer circumference of the counter shaft 29, driven gears 49a to 49f of six speeds in the speed-change gear group 45 are arranged. The corresponding speed-change gears among the drive gears 48a to 48f and the driven gears 49a to 49f are meshed with each other to configure pairs of speed-change gears corresponding to the respective speeds.

The twin clutch 26 has first and second disc clutches (hereinafter, referred to simply as clutches in some cases) 51a and 51b of a hydraulic type which are coaxially arranged while being adjacent to each other, and the inner and outer shafts 43 and 44 are coaxially coupled to the respective clutches 51a and 51b. A primary driven gear 58 which is meshed with the primary drive gear 58a is coaxially coupled to a clutch outer shared by the clutches 51a and 51b, and the rotational drive power of the crankshaft 21 is input to the respective clutches 51a and 51b through the respective gears 58 and 58a. The power transmission in the respective clutches 51a and 51b can be individually connected or disconnected depending on whether or not a hydraulic pressure is supplied from the hydraulic pressure supplying apparatus 46.

The hydraulic pressure supplying apparatus 46 is composed mainly of first and second oil pumps 31 and 32 which are coaxially arranged inside the crankcase 14 on the lower side. A main oil-feeding-passage 34 extends from a discharge port of the first oil pump 31. An oil feeding passage 35 extends from a discharge port of the second oil pump 32. First and second clutch actuators 91a and 91b are connected to the downstream side of the oil feeding passage 35. First and second oil-supplying-passages 92a and 92b respectively extend from the clutch actuators 91a and 91b to clutch-connection hydraulic chambers of the clutches 51a and 51b.

The first oil pump 31 is used for supplying a hydraulic pressure to respective portions of the engine 13. The discharge port thereof is connected to a main oil gallery (not shown) through the main oil-feeding-passage 34. On the other hand, the second oil pump 32 serves as a hydraulic pressure generating source for operating the twin clutch 26. The discharge port thereof is connected to the oil feeding passage 35 for the twin clutch 26.

The oil feeding passage 35 can be individually in communication with the first oil-supplying-passage 92a or second oil-supplying-passage 92b by operating the respective clutch actuators 91a and 91b. When the oil feeding passage 35 is in communication with the first oil-supplying-passage 92a, a relatively-high hydraulic pressure from the second oil pump 32 is supplied to the clutch-connection hydraulic chamber of the first clutch 51a through the first oil-supplying-passage 92a, and the first clutch 51a is switched from a disconnected state to a connected state. On the other hand, when the oil feeding passage 35 is in communication with the second oil-supplying-passage 92b, a hydraulic pressure from the second oil pump 32 is supplied to the clutch-connection hydraulic chamber of the second clutch 51b through the second oil-supplying-passage 92b, and the second clutch 51b is switched from a disconnected state to a connected state.

The change mechanism 24 allows a plurality of shift forks 24b to be moved by rotating a shift drum 24a arranged in parallel with the respective shafts 28 and 29, so as to switch a pair of speed-change gears used for power transmission to the counter shaft 29. The drive mechanism 39 is arranged at a left end of the shift drum 24a. It should be noted that the reference numeral S1 in the drawing denotes a sensor (pairs of switch cams 131 and switches 33 for detecting a rotational angle of a barrel cam 122 to be described later) for detecting an operation amount of the drive mechanism 39 in order to detect a speed-change gear of the transmission 47.

The electronic control unit (ECU) 42 operates and controls the twin-clutch transmission 23 and the gear shift apparatus 41 on the basis of information and the like from the respective sensors so as to shift a speed-change gear (shift position) of the transmission 47.

By connecting one of the clutches 51a and 51b and disconnecting the other one, power transmission is performed using any pair of speed-change gears to be coupled to one of the inner and outer shafts 43 and 44. Then, one of the pairs of speed-change gears which is to be coupled to the other of the inner and outer shafts 43 and 44 is preliminarily selected for use next time, and from this state, one of the clutches 51a and 51b is disconnected and the other one is connected. Accordingly, power transmission is switched to one using the preliminarily-selected pair of speed-change gears, and thus upshift or downshift of the transmission 47 is carried out.

The transmission 47 is of a constant-mesh type in which the drive gears 48a to 48f and the driven gears 49a to 49f corresponding to the respective speeds are constantly meshed with each other. Each gear is roughly classified into a free gear which is rotatable relative to a shaft and a slide gear which is spline-fitted to a shaft in a relatively-nonrotatable manner. An arbitrary slide gear is appropriately slid by the change mechanism 24, so that power transmission using a pair of speed-change gears corresponding to any speed can be performed.

With reference to FIG. 2, the change mechanism 24 includes the shift drum 24a which is rotatably supported by the transmission case 22 and has a plurality of cam grooves at the outer circumference. A fork rod 24c is supported by the transmission case 22. The plurality of the shift forks 24b are slidably supported by the fork rod 24c in the axis direction of the fork rod 24c. The shift drum 24a and the fork rod 24c are arranged in parallel with the respective shafts 28 and 29.

The respective shift forks 24b extend to the main shaft 28-side or the counter shaft 29-side from their proximal ends where the fork rod 24c is allowed to penetrate. Tip ends of the bifurcated shape are engaged with the slide gears of the transmission 47. The proximal ends of the shift forks 24b are engaged with the cam grooves of the shift drum 24a. When the shift drum 24a is rotated, the shift forks 24b are allowed to move along the fork rod 24c in accordance with the patterns of the cam grooves. A predetermined slide gear of the transmission 47 is allowed to slide so as to shift a speed-change gear.

The drive mechanism 39 of the gear shift apparatus 41 is integrally attached to the outside of a lower left portion of the crankcase 14.

Figure 5:
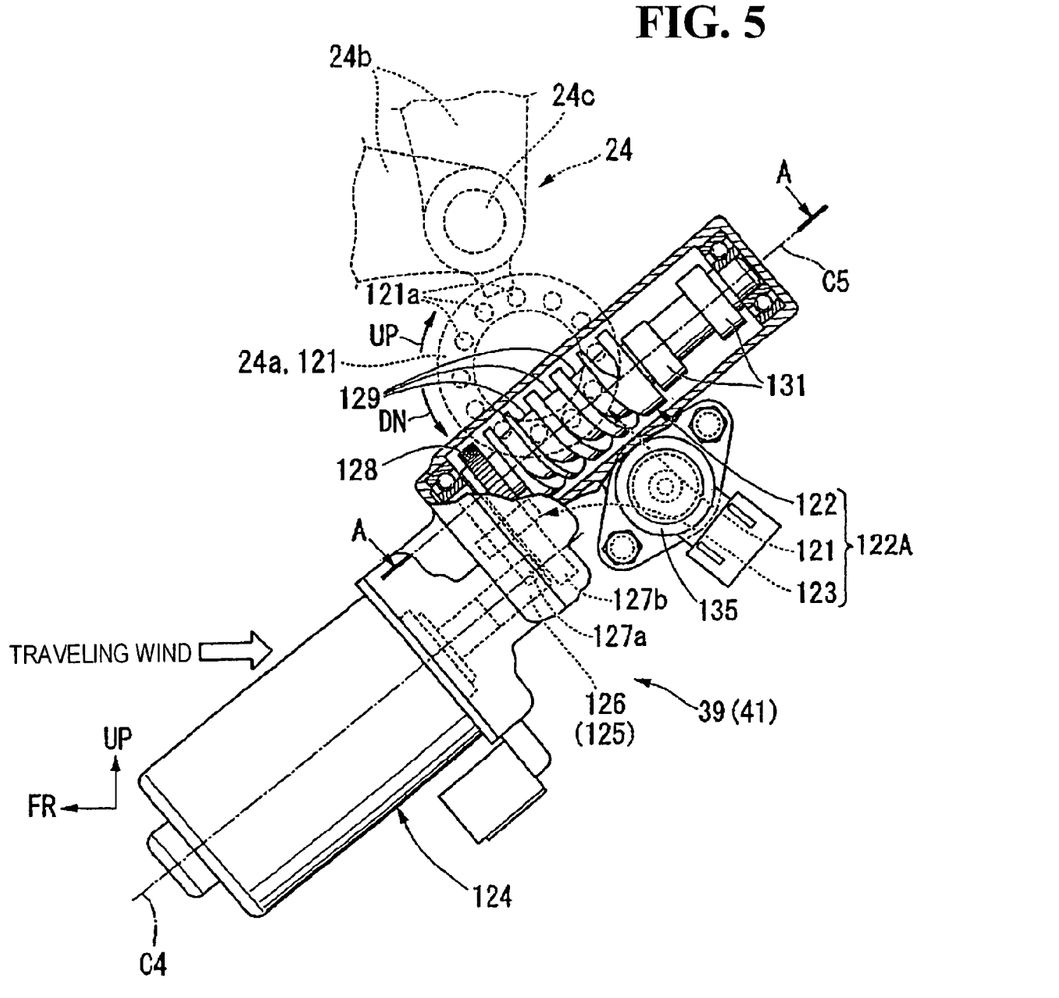
FIG. 5 is a left side view of a gear shift apparatus of the engine while including a partial cross sectional view.
Figure 6:
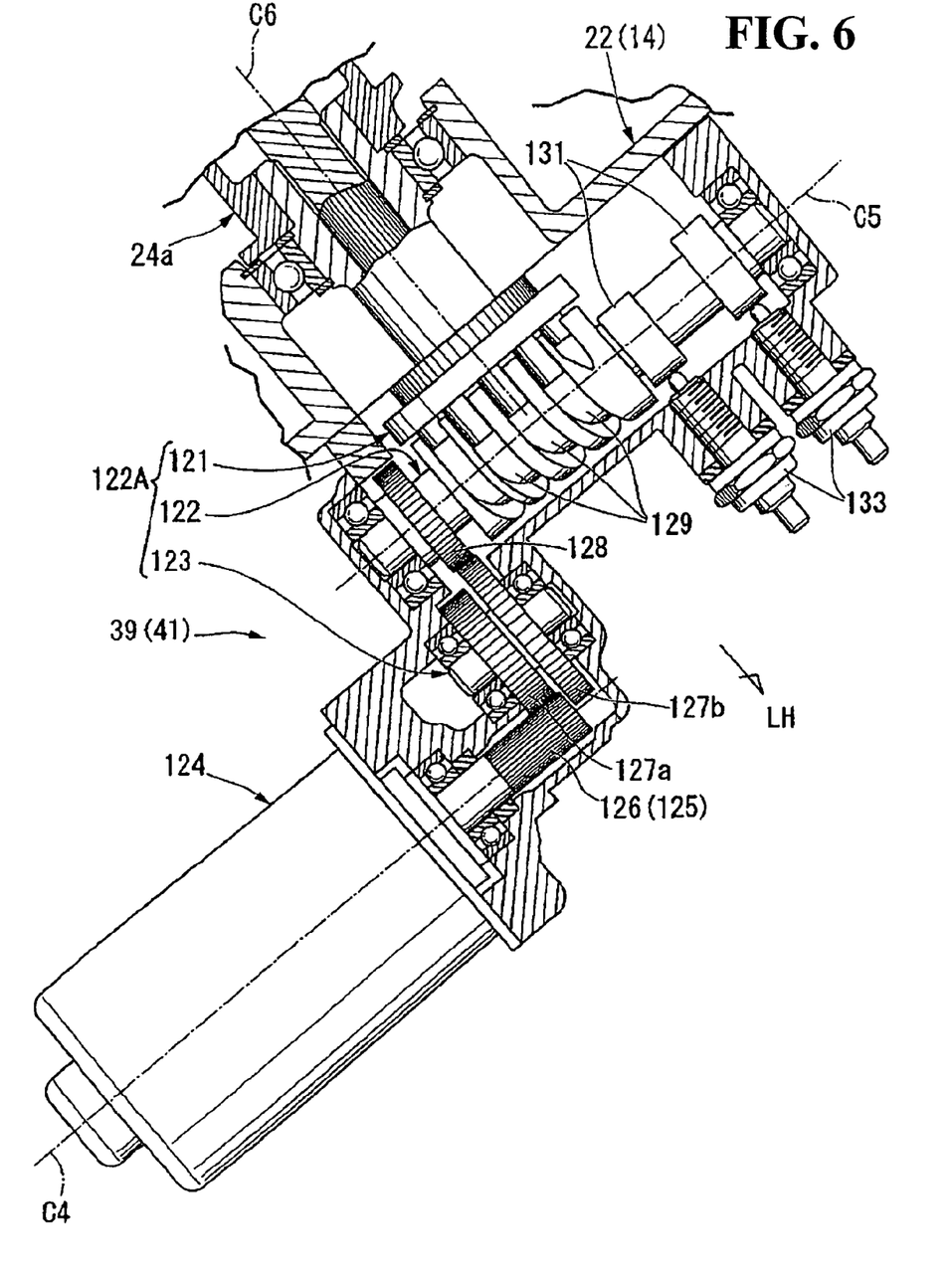
FIG. 6 is a cross sectional view taken along the line A-A of FIG. 5.

With reference to FIGS. 5 and 6, the drive mechanism 39 includes a pin gear 121 which is coaxially fixed to a left end of the shift drum 24a of the change mechanism 24. A barrel cam 122 in a worm shape is engaged with the pin gear 121. A speed-change actuator 124 applies a rotational drive power to the barrel cam 122 through a relay gear shaft 123. The speed-change actuator 124 is an electric motor. The shift drum 24a is rotated by a drive power of the speed-change actuator 124 so as to change a speed-change gear of the transmission 47. Hereinafter, the speed-change actuator 124 is referred to as an electric motor 124 in some cases. In addition, a combination of the pin gear 121, the barrel cam 122, and the relay gear shaft 123 is referred to as a transmission mechanism 122A.

The electric motor 124 is arranged in such a manner that a rotational drive axis line C4 thereof is inclined downward to the front (inclined relative to the vehicle traveling direction), and a drive shaft 125 thereof is allowed to protrude to the rear. A drive gear 126 is formed at the outer circumference of a tip end of the drive shaft 125. The drive gear 126 is meshed with a first relay gear 127a of the relay gear shaft 123. A second relay gear 127b of the relay gear shaft 123 is meshed with a driven gear 128 at a front end of the barrel cam 122 located obliquely above and behind the electric motor 124.

The barrel cam 122 has a rotational axis line C5 that is in parallel with the rotational drive axis line C4 of the electric motor 124, and is arranged in such a manner that the rotational axis line C5 is inclined downward to the front, as similar to the electric motor 124. A plurality of cam grooves 129 are formed at the outer circumference of a front portion of the barrel cam 122. The cam grooves 129 are continued to each other so as to form a thread groove in a spiral manner. A part of a plurality of pins 121a which are provided at the pin gear 121 in an erect manner is engaged with the respective cam grooves 129.

The pin gear 121 is configured in such a manner that the plurality of pins 121a formed at even intervals in the circumferential direction of the left side of the disc-shaped main body of the pin gear are allowed to protrude in parallel with the shift drum 24a. The rotational axis line C5 of the barrel cam 122 is arranged orthogonal to a rotational axis line C6 along the left-right direction of the pin gear 121 and the shift drum 24a. In addition, the rotational axis line C5 of the barrel cam 122 is arranged obliquely below and behind the rotational axis line C6 of the shift drum 24a, viewed from the lateral side of the engine. The barrel cam 122 is adjacent to the pin gear 121 on the left outer side, and the pins 121a located on the lower rear side of the pin gear 121 are engaged with the cam grooves 129.

When the electric motor 124 is driven by control of the ECU 42 and, for example, the barrel cam 122 is rotated in the positive direction by 360 degrees, the respective cam grooves 129 are displaced forward only by one line (by one pitch) in the groove-aligned direction (the direction of the axis line C5) so as to rotate the pin gear 121 and the shift drum 24a in the upshift direction (the direction of the arrow UP in FIG. 5) by an angle corresponding to the one pitch. The rotational angle of the shift drum 24a at this time corresponds to an angle with which a speed-change gear of the transmission 47 is upshifted by one speed.

Similar thereto, when the electric motor 124 is driven and the barrel cam 122 is rotated in the inverse direction by 360 degrees, the respective cam grooves 129 are displaced rearward only by one pitch in the groove-aligned direction so as to rotate the pin gear 121 and the shift drum 24a in the downshift direction (the direction of the arrow DN in FIG. 5) by an angle corresponding to the one pitch. The rotational angle of the shift drum 24a at this time corresponds to an angle with which a speed-change gear of the transmission 47 is downshifted by one speed.

Two switch cams 131 aligned along the axis line C5 are provided at the outer circumference of a rear portion of the barrel cam 122. Two switches 133 are provided on, for example, the left side relative to the switch cams 131 in such a manner that parts of the switches are opposed to cam faces of the switch cams. The switch cams 131 and the switches 133 configure the sensor S1 for detecting a rotational position of the barrel cam 122. It should be noted that the reference numeral 135 in FIG. 5 denotes a shift sensor for detecting a rotational position of the shift drum 24a.

The switch cams 131 are formed in substantially the same shape, viewed from the axis direction of the barrel cam, and the cam faces are formed at the outer circumferences thereof. The switch cams 131 are arranged in such a manner that the cam faces have a predetermined phase difference therebetween in the rotational direction of the barrel cam. On the other hand, the switches 133 are arranged so as to have the same phase in the rotational direction of the barrel cam. Depending on the status ON or OFF of the switches 133, it is possible to detect whether or not the barrel cam 122 has been rotated in the positive and negative directions by a predetermined angle.

As shown in FIG. 2, the speed-change actuator 124 and the transmission mechanism 122A are arranged below relative to the counter shaft 29 and the dividing plane B (in addition, arranged below relative to the axis line C2 of the main shaft 28), viewed from the lateral side of the engine.

With reference to FIG. 3, the speed-change actuator 124 and the transmission mechanism 122A are located on the inner side (on the inner side in the crankshaft direction), in the left-right direction, relative to an outer end (an outer end in the crankshaft direction, the position is indicated by the line E in FIG. 3), in the left-right direction, of the generator cover 104, and are arranged below relative to the generator cover 104 as a whole.

As described above, in the engine 13 of the above-described embodiment including: the twin-clutch transmission 23 which is provided in the power transmission pathway through which a rotational drive power of the crankshaft 21 is transmitted to the drive wheel (rear wheel 11); the counter shaft 29 which configures a part of the twin-clutch transmission 23 and through which the rotational drive power of the crankshaft 21 that is transmitted to the twin-clutch transmission 23 is output to the drive wheel-side; the engine case 14A in which the crankshaft 21 and the twin-clutch transmission 23 are accommodated; the speed-change actuator 124 which is attached to the engine case 14A to control a speed-change operation of the twin-clutch transmission 23; and the transmission mechanism 122A which is provided between the speed-change actuator 124 and the change mechanism 24 that allows the twin-clutch transmission 23 to perform a speed-change operation and which transmits a drive power of the speed-change actuator 124 to the change mechanism 24, the speed-change actuator 124 and the transmission mechanism 122A are arranged below relative to the counter shaft 29.

According to this configuration, the center of gravity of the whole engine 13 is lowered, and thus the lowered center of gravity of the vehicle can be realized. In addition, although a plurality of vehicle functional components such as components for air intake and electric components are usually arranged above the engine 13, it is possible to suppress the effect on arrangement spaces for the respective functional components by arranging the speed-change actuator 124 and the transmission mechanism 122A at a lower position of the engine 13.

Further, since the speed-change actuator 124 is arranged below relative to the transmission mechanism 122A in the engine 13, the speed-change actuator 124 having a relatively heavy weight can be arranged below relative to the transmission mechanism 122A, thus realizing the further lowered center of gravity of the vehicle.

Furthermore, since the speed-change actuator 124 is an electric motor and the rotational drive axis line C4 of the electric motor 124 is obliquely arranged relative to the vehicle traveling direction in the engine 13, traveling wind is likely to hit the speed-change actuator (electric motor) 124, and thus the speed-change actuator 124 can be easily cooled.

Furthermore, since the engine case 14A has the generator cover 104 that laterally protrudes and the speed-change actuator 124 and the transmission mechanism 122A are arranged on the generator cover 104-side in the engine case 14A and on the inner side relative to an outer end of the generator cover 104, a space formed around the generator cover 104 can be effectively used as an arrangement space for the speed-change actuator 124 and the transmission mechanism 122A. In addition, since the speed-change actuator 124 and the transmission mechanism 122A are arranged on the inner side relative to an outer end of the generator cover 104, it is possible to prevent the engine width from increasing in the vehicle-width direction.

Additionally, since the speed-change actuator 124 is arranged below relative to the generator cover 104 in the engine 13, traveling wind is likely to hit the speed-change actuator 124, thus realizing the further lowered center of gravity of the vehicle.

Second Embodiment

Figure 7:
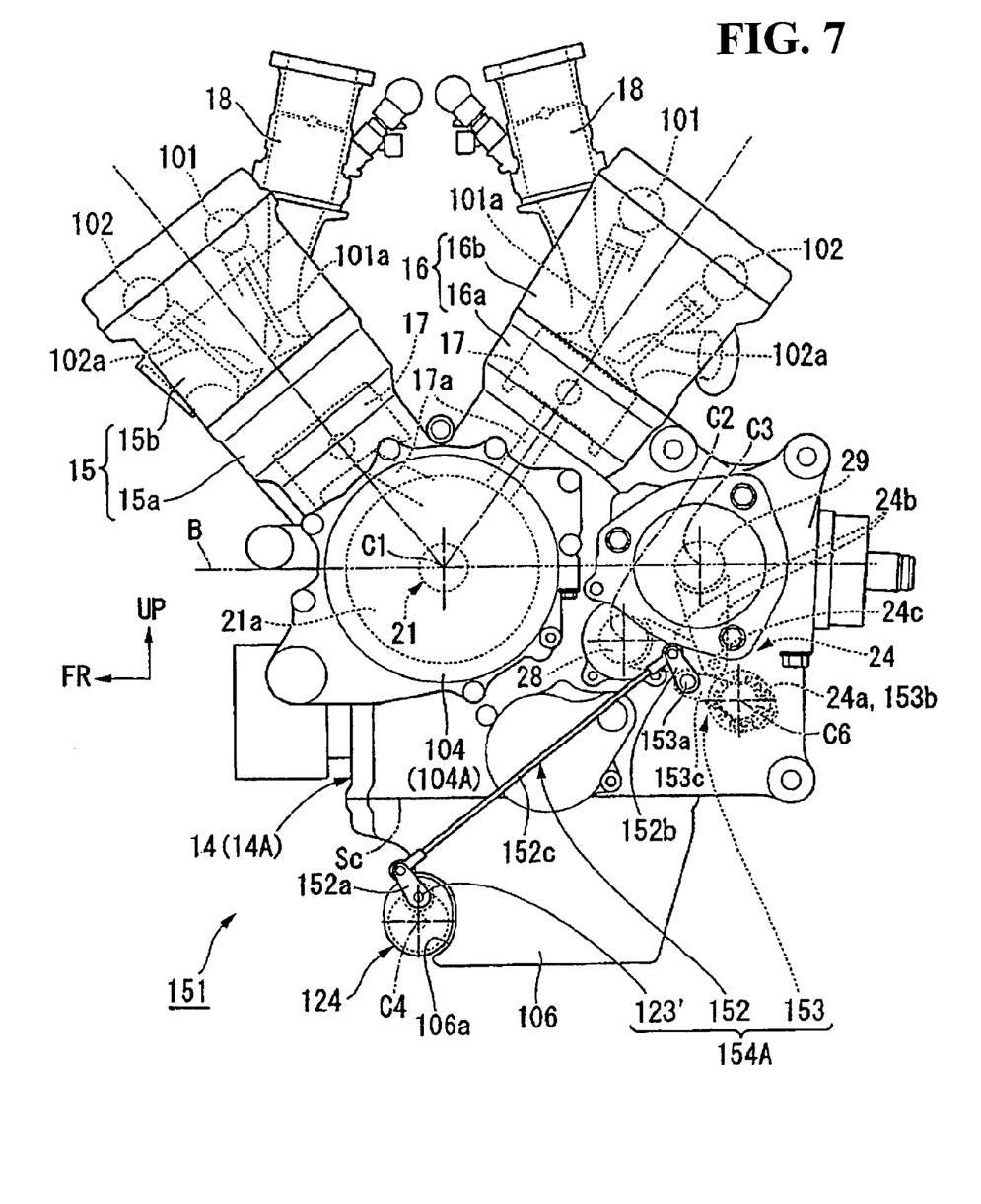
FIG. 7 is a left side view of an engine in a second embodiment of the present invention.

Next, a second embodiment of the present invention will be described with reference to FIGS. 7 and 8.

Where an engine 151 (see FIG. 7) of the second embodiment mainly differs from the engine 13 of the first embodiment is that the speed-change actuator (electric motor) 124 is arranged around the oil pan 106. The same reference numerals are given to parts identical to those in the first embodiment. Thus, the explanation thereof will be omitted.

The electric motor 124 is arranged on the outside relative to (immediately in front of) a front wall of the oil pan 106, while the rotational drive axis line C4 is directed in the left-right direction (in parallel with the shift drum 24a). At the front wall of the oil pan 106, there is formed a concave portion 106a into which a rear portion of the electric motor 124 enters. A rotational drive power of the electric motor 124 is transmitted to the shift drum 24a through a reduction gear shaft 123' adjacent to the electric motor 124, a link mechanism 152 and a shifter mechanism 153.

The link mechanism 152 includes a driving arm 152a which is coupled to a left end of the reduction gear shaft 123', a driven arm 152b which is coupled to a left end of a change spindle 153a of the shifter mechanism 153, and a connecting rod 152c which is provided between the arms 152a and 152b.

The shifter mechanism 153 includes the change spindle 153a which is arranged in parallel with the shift drum 24a and is arranged while being offset in the vicinity of a left end of the shift drum 24a. A drum center 153b is coaxially provided at a left end of the shift drum 24a in an integrally rotatable manner. A change arm 153c is coupled to a right end of the change spindle 153a and extends toward the drum center 153b so as to be engaged therewith.

The drum center 153b configures a ratchet mechanism. When the change spindle 153a and the change arm 153c are rotated in the positive and negative directions from a predetermined initial position by a predetermined angle, the ratchet mechanism allows the drum center 153b and the shift drum 24a to rotate by a predetermined angle. Then, only the change spindle 153a and the change arm 153c can be returned to the initial position. That is, the ratchet mechanism allows for feeding of the shift drum 24a by repeating the positive and negative rotations of the shift spindle 153a.

When the electric motor 124 is reciprocated in the positive and negative directions by a predetermined angle, the shift drum 24a is rotated in one direction by a predetermined angle through the reduction gear shaft 123', the transmission mechanism 122A, and the shifter mechanism 153, so that a speed-change gear of the transmission 47 is shifted by one speed. Hereinafter, assuming that a combination of the reduction gear shaft 123', the link mechanism 152, and the shifter mechanism 153 is a transmission mechanism 154A, the transmission mechanism 154A, together with the electric motor 124, is located below relative to the counter shaft 29, and is located on the inner side relative to an outer end of the generator cover 104 (the illustration is omitted).

It should be noted that the following configuration may be adapted; the shift spindle 153a is coaxially provided at the shift drum 24a in an integrally rotatable manner and the shift drum 24a is directly rotated in the positive and negative directions by using a transmission mechanism composed only of the reduction gear shaft 123' and the link mechanism 152, in accordance with a rotational angle in the positive and negative directions of the electric motor 124.

Figure 8:
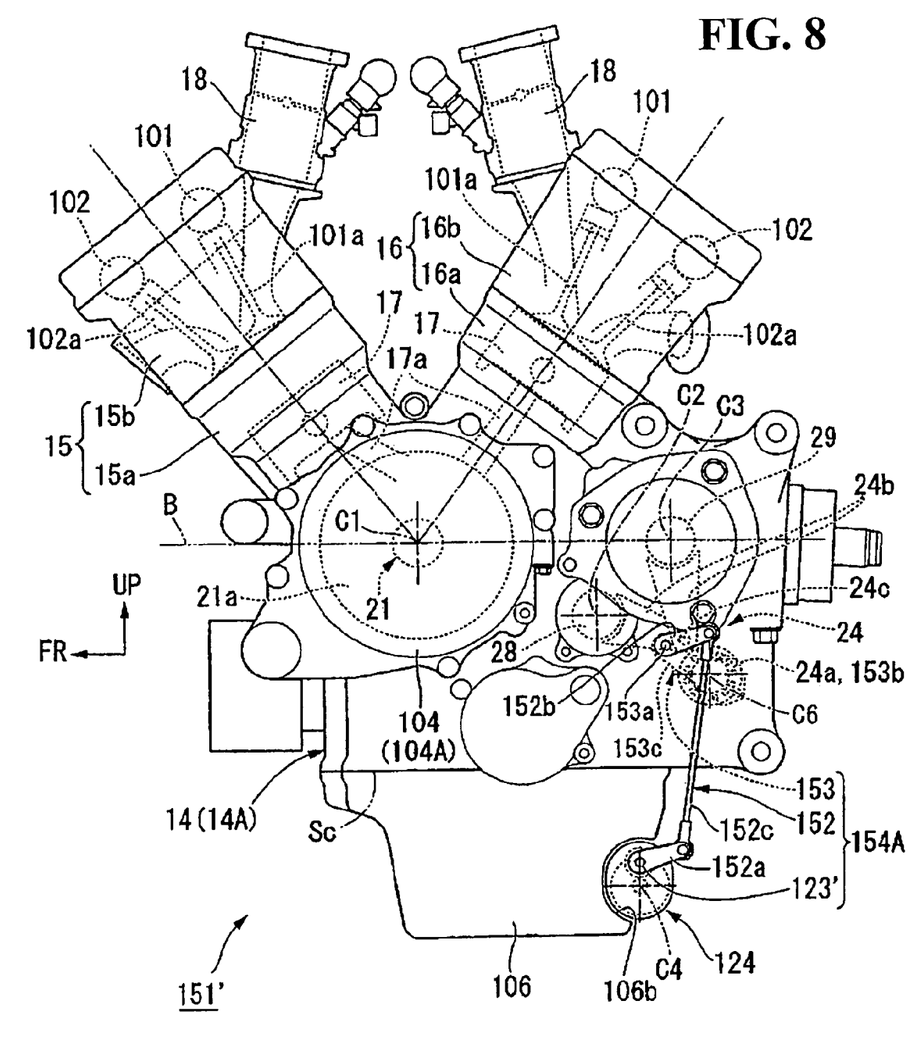
FIG. 8 is a left side view showing a modified example of the engine shown in FIG. 7.

Furthermore, an engine 151' shown in FIG. 8 is a modified example of the second embodiment in which the speed-change actuator (electric motor) 124 is arranged on the outside relative to (immediately behind) a rear wall of the oil pan 106.

The electric motor 124 is arranged in such a manner that the rotational drive axis line C4 is directed in the left-right direction. At the rear wall of the oil pan 106, there is formed a concave portion 106b into which a front portion of the electric motor 124 enters. A rotational drive power of the electric motor 124 is transmitted to the shift drum 24a through a transmission mechanism 154A' configured by changing only the layout of the link mechanism 152 in the transmission mechanism 154A, so that a speed-change gear of the transmission 47 is shifted.

As described above, in the engine 151 or 151' of the embodiment, the engine case 14A has the oil pan 106 protruding downward, and the speed-change actuator 124 is arranged around the oil pan 106.

According to this configuration, a space formed around the oil pan 106 can be effectively used as an arrangement space for the speed-change actuator 124, and in addition, the further lowered center of gravity of the vehicle can be realized. Furthermore, since the degree of freedom of the shape of the oil pan 106 is relatively high, a region in the oil pan 106 where the speed-change actuator 124 is arranged is concaved, so that it is possible to suppress an increase in dimension of the outer shape of the engine while preventing the speed-change actuator 124 from protruding in a wide range toward the outside of the oil pan 106. Furthermore, since the number of vehicle functional components is relatively small around the oil pan 106, it is possible to relatively freely arrange the speed-change actuator 124 by suppressing the effect on an arrangement for the functional components.

The present invention is not limited to the above-described embodiments. For example, the speed-change actuator may be of a hydraulic or mechanical type instead of an electric type. Similar thereto, the transmission mechanism may be of an electric or hydraulic type instead of a mechanical type.

In addition, the configuration of the present invention can be applied to single cylinder engines, in-line engines, vertically-placed engines whose crankshaft axis lines are directed in the front-rear direction, and reciprocating engines of various types. Furthermore, the vehicle in which the engine is mounted is not limited to the motorcycle, but may be a saddle-ride type three-wheeled or four-wheeled vehicle, or a scooter-type vehicle having low-floor footrests.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine including a speed-change actuator, comprising:
    a transmission provided in a power transmission pathway, a rotational drive power of a crankshaft being transmitted to a drive wheel through the power transmission pathway;
    an output shaft that forms a part of the transmission, the rotational drive power of the crankshaft that is transmitted to the transmission being output to the drive wheel-side through the output shaft;
    an engine case, the crankshaft and the transmission being accommodated in the engine case; and
    a speed-change actuator attached to the engine case to control a speed-change operation of the transmission,
    wherein the speed-change actuator is arranged below the output shaft,
    wherein the speed-change actuator is an electric motor, and an axis line of the electric motor is obliquely arranged relative to the vehicle traveling direction and is inclined downwardly toward a front of the vehicle, and
    wherein the axis line of the electric motor is arranged along the vehicle traveling direction.

2. The engine including a speed-change actuator according to claim 1, further comprising a transmission mechanism provided between the speed-change actuator and a change mechanism, said transmission mechanism allowing the transmission to perform a speed-change operation and transmitting a drive power of the speed-change actuator to the change mechanism,
    wherein the transmission mechanism is arranged below the output shaft.

3. The engine including a speed-change actuator according to claim 2, wherein the speed-change actuator is arranged below the transmission mechanism.

4. The engine including a speed-change actuator according to claim 1, wherein the engine case has a generator cover that laterally protrudes therefrom, and the speed-change actuator is arranged on the generator cover-side in the engine case and on the inner side relative to an outer end of the generator cover.

5. The engine including a speed-change actuator according to claim 4, wherein the speed-change actuator is arranged below the generator cover.

6. An engine including a speed-change actuator, comprising:
    a transmission including a main shaft and a counter shaft;
    an engine case, a crankshaft and the transmission being accommodated in the engine case; and
    a speed-change actuator attached to the engine case to control a speed-change operation of the transmission,
    wherein the speed-change actuator is arranged below the main shaft,
    wherein the speed-change actuator is an electric motor, and an axis line of the electric motor is obliquely arranged relative to the vehicle traveling direction and is inclined downwardly toward a front of the vehicle, and
    wherein the axis line of the electric motor is arranged along the vehicle traveling direction.

7. The engine including a speed-change actuator according to claim 6, further comprising a transmission mechanism provided between the speed-change actuator and a change mechanism, said transmission mechanism allowing the transmission to perform a speed-change operation and transmitting a drive power of the speed-change actuator to the change mechanism,
    wherein the transmission mechanism is arranged below the main shaft.

8. The engine including a speed-change actuator according to claim 7, wherein the speed-change actuator is arranged below the transmission mechanism.

9. The engine including a speed-change actuator according to claim 6, wherein the engine case has a generator cover that laterally protrudes therefrom, and the speed-change actuator is arranged on the generator cover-side in the engine case and on the inner side relative to an outer end of the generator cover.

10. The engine including a speed-change actuator according to claim 9, wherein the speed-change actuator is arranged below the generator cover.

* * * * *